(12) United States Patent
Chien (10) Patent No.: US 8,186,493 B2
(45) Date of Patent: May 29, 2012

(54) CLUTCH FOR MOTOR VEHICLE

(76) Inventor: Cheng Ming Chien, Chiayi (TW)

( * ) Notice: Subject to any disclaimer, the term of this patent is extended or adjusted under 35 U.S.C. 154(b) by 287 days.

(21) Appl. No.: 12/723,546

(22) Filed: Mar. 12, 2010

(65) Prior Publication Data

US 2011/0220448 A1 Sep. 15, 2011

(51) Int. Cl.
*F16D 43/14* (2006.01)
(52) U.S. Cl. .............. 192/48.5; 192/48.7; 192/105 BB; 192/105 CD
(58) Field of Classification Search ............... 192/48.5, 192/48.7, 53.51, 53.6, 105 BB, 105 CD, 192/103 B
See application file for complete search history.

(56) References Cited

U.S. PATENT DOCUMENTS

| 6,609,600 | B1 * | 8/2003 | Shen ........................... 192/48.5 |
| 2003/0089574 | A1 * | 5/2003 | Chen et al. ............. 192/105 CD |

* cited by examiner

*Primary Examiner* — Richard M. Lorence (57) ABSTRACT

A clutch vehicle includes a driving wheel driven by output of an engine of a motor vehicle. An actuator plate is jointly rotatable with the driving wheel and includes a side plate having a peg. Shoes mounted on the side plate pivot outward when the side plate rotates, allowing joint rotation of the actuator plate and a clutch hub surrounding the actuator plate. A block is movably mounted to the disc. An elastic element is mounted between the block and the clutch hub. The block is located in a first position not located in a circumferential path of the peg under action of the elastic element when the clutch hub does not rotate. The block is moved to a second position in the circumferential path of the peg by centrifugal force of the clutch hub when the clutch hub exceeds a preset speed.

4 Claims, 12 Drawing Sheets

CLUTCH FOR MOTOR VEHICLE

BACKGROUND OF THE INVENTION

1. Field of the Invention

The present invention relates to a clutch for a motor vehicle and, more particularly, to a clutch for a motor vehicle that has less transmission loss and that provides engine braking effect.

2. Description of the Related Art

Figure 9:
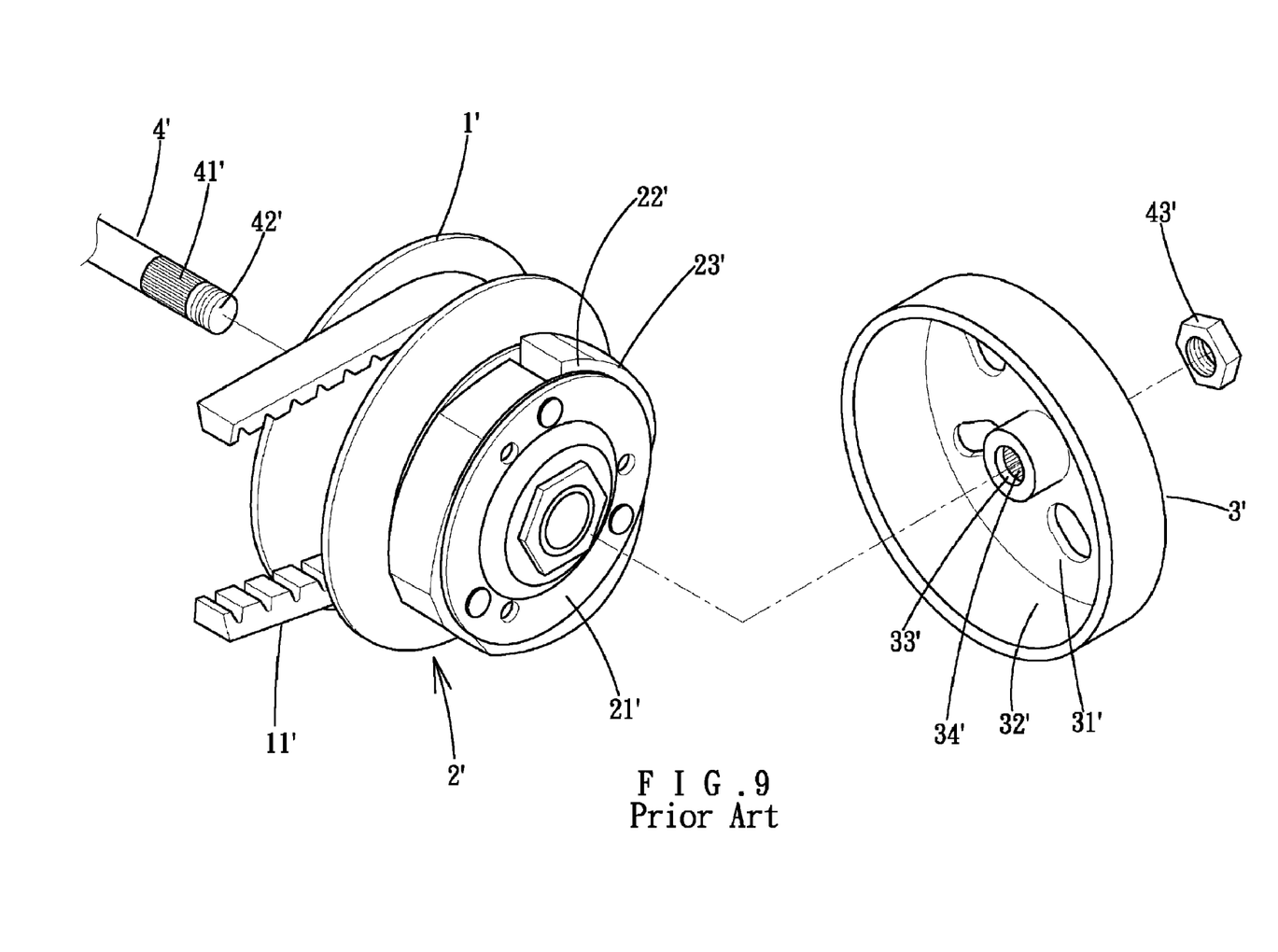
FIG. 9 shows an exploded, perspective view of a conventional centrifugal type clutch.
Figure 10:
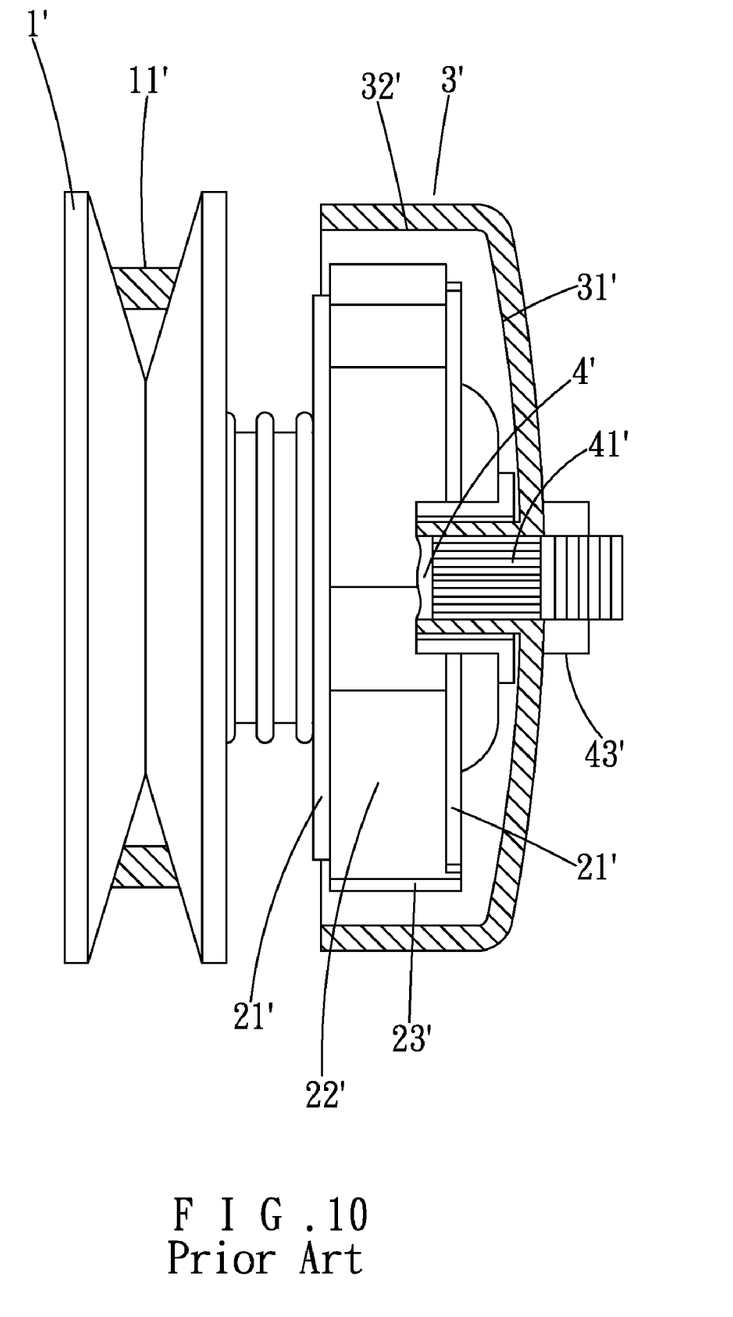
FIG. 10 shows a partial, cross sectional view of the clutch of FIG. 9.
Figure 11:
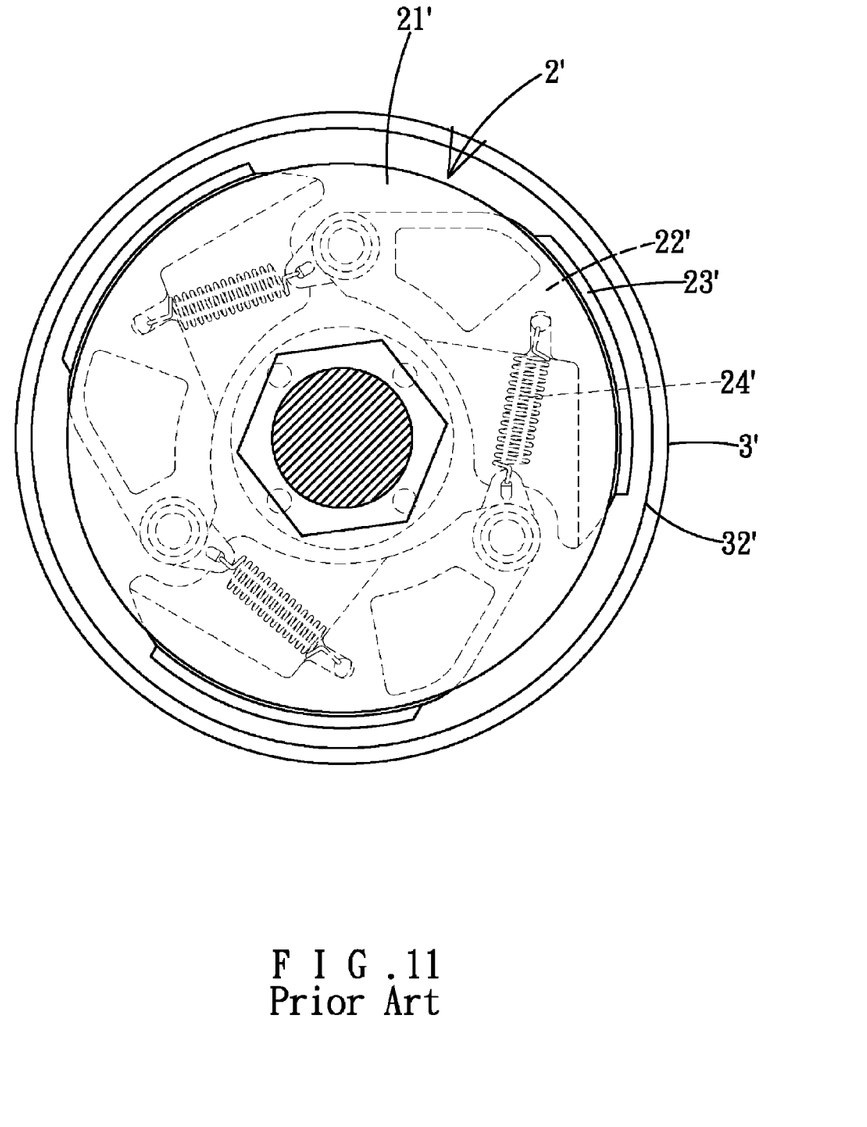
FIG. 11 shows an end elevational view of the clutch of FIG. 10.

Motor vehicles with continuously variable transmission generally utilizes centrifugal type clutches. FIGS. 9-11 shows a conventional centrifugal type clutch including a driving wheel 1', an actuator plate 2', a clutch hub 3', and a shaft 4'. The driving wheel 1' is driven by output of an engine via a belt 11'. The actuator plate 2' rotates jointly with the driving wheel 1' and includes a side plate 21' to which a plurality of shoes 22' is pivotably mounted. A friction plate 23' is mounted on an outer face of each shoe 22'. The shoes 22' are returned by springs 24'. The clutch hub 3' is mounted around the side plate 21' of the actuator plate 2' and includes a disc 31' and an annular wall with an inner peripheral friction section 32' surrounding the shoes 22'. The disc 31' includes a hole 33' having spline grooves 34' formed in an inner periphery thereof. The shaft 4' is extended through the driving wheel 1', the actuator plate 2', and the clutch hub 3'. The shaft 4' includes a spline section 41' engaged with the spline grooves 34'. The shaft 4' further includes a threaded end 42' extending beyond the disc 31' and engaged with a nut 43'. The shaft 4' is connected to a wheel axle of a motor vehicle.

Figure 12:
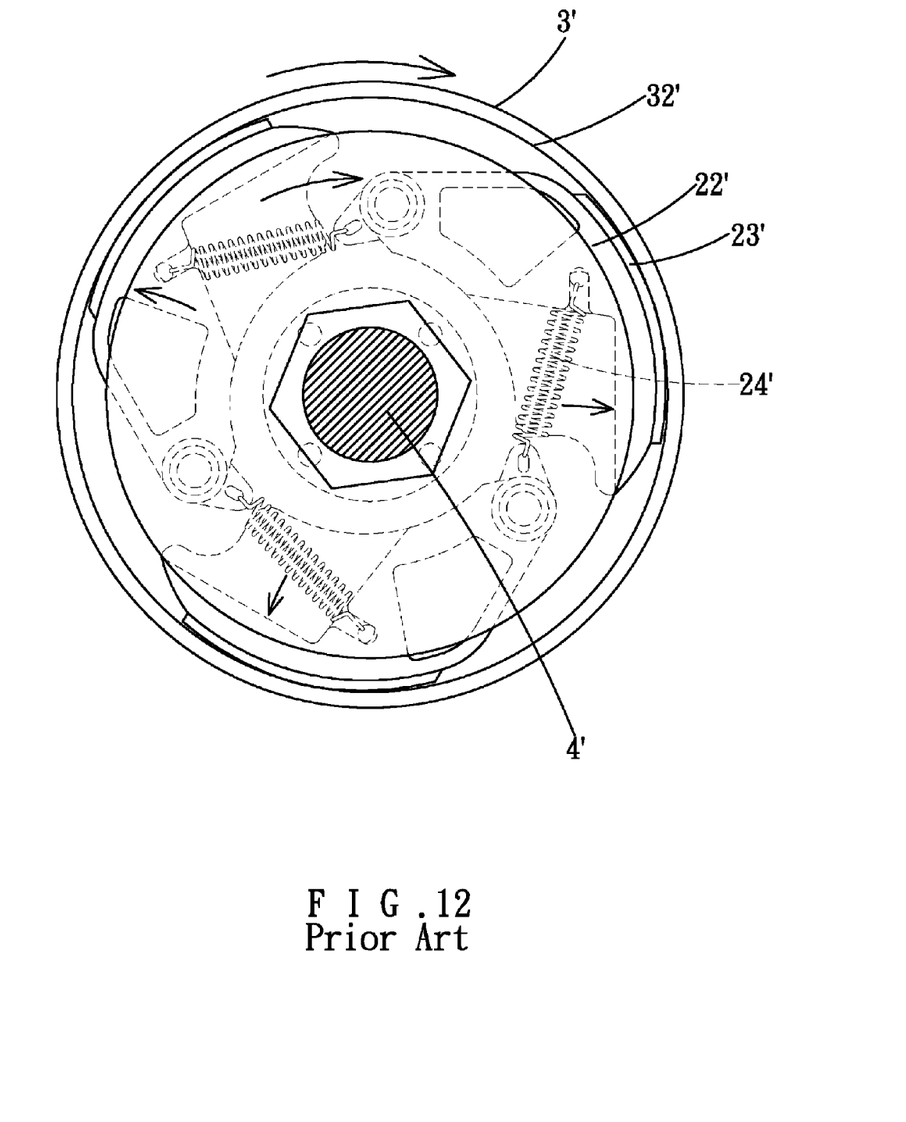
FIG. 12 shows an end elevational view of the clutch of FIG. 10 with a clutch hub driven by an actuator plate of the clutch.

The output of the engine drives the belt 11', the driving wheel 1', and the actuator plate 2' to rotate. With reference to FIG. 12, when the centrifugal force of the rotating actuator plate 2' is larger than the returning force of the springs 24', the shoes 22' pivot outward so that the friction plates 23' are in friction engagement with the inner peripheral friction section 32' of the clutch hub 3'. Thus, the actuator plate 2' can drive the clutch hub 3', the shaft 4', and the wheel axle to rotate, moving the motor vehicle forward while providing continuously variable transmission. However, slipping is liable to occur when the friction plates 23' wear or the inner peripheral friction section 32' is dirtied by dust and/or oil, leading to transmission loss.

Taiwan Utility Model No. M324138 discloses a centrifugal type clutch including first and second springs respectively for larger and smaller clutch plates to enhance the engaging force between a distal end of the larger clutch plate and the clutch hub. However, transmission loss still occurs.

Compared to lever type gear shifting, centrifugal type clutches provide smooth gear shifting and driving comfort. However, the centrifugal type clutches can not provide engine braking when the friction plates and the clutch hub are not rotating jointly. Thus, braking of downhill motor vehicles with centrifugal type clutches relies on the braking mechanism of the motor vehicles. Namely, the motor vehicles with centrifugal type clutches are not as safe as motor vehicles with lever type gear shifting.

Thus, a need exists for a clutch with less transmission loss while providing engine braking effect.

BRIEF SUMMARY OF THE INVENTION

The present invention solves this need and other problems in the field of efficient and safe transmission by providing, in a preferred form, a clutch for a motor vehicle includes a driving wheel adapted to be driven by output of an engine of the motor vehicle. An actuator plate is jointly rotatable with the driving wheel and includes a side plate. A plurality of shoes is pivotably mounted to the side plate. A friction plate is mounted on an outer face of each shoe. The shoes are connected to a plurality of springs. The side plate further includes a peg. A clutch hub is mounted around the side plate of the actuator plate. The clutch hub includes a disc and an annular wall with an inner peripheral friction section surrounding the shoes. The shoes move outward when the actuator plate rotates, engaging the friction plates with the inner peripheral friction section of the clutch hub so that the clutch hub rotates jointly with the actuator plate. The clutch further includes a linking mechanism for abutting and moving the peg while the clutch hub is rotating. The linking mechanism includes a block and an elastic element. The block is movably mounted to the disc. The elastic element is mounted between the block and the clutch hub. The block is located in a first position not located in a circumferential path of the peg under action of the elastic element when the clutch hub does not rotate. The block is moved to a second position in the circumferential path of the peg by centrifugal force of the clutch hub when the clutch hub exceeds a first preset speed. A shaft extends through the driving wheel, the actuator plate, and the clutch hub. The shaft is jointly rotatable with the driving wheel and adapted to be connected to a wheel axle of the motor vehicle.

In the most preferred form, the block is moved to the second position in the circumferential path of the peg when the clutch hub rotated by the wheels of the downhill motor vehicle exceeds a second preset speed. The block abuts the peg such that the actuator and the driving wheel are driven by the clutch hub to provide engine braking.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

With reference to FIGS. 1-5, a clutch according to the preferred teachings of the present invention includes a driving wheel 1, an actuator plate 2, a clutch hub 3, and a shaft 4. The driving wheel 1 is driven by output of an engine of a motor vehicle via a belt 11 mounted around the driving wheel 1.

The actuator plate 2 rotates jointly with the driving wheel 1. In the preferred form shown, the actuator plate 2 includes inner and outer side plates 21 having aligned through-holes 211. A plurality of shoes 22 is pivotably mounted between the side plates 21. A friction plate 23 is mounted on an outer face of each shoe 22. The shoes 22 are connected to springs 24. Furthermore, the outer side plate 21 includes a peg 25 extending in a direction parallel to an extending direction of the through-holes 211. It can be appreciated that actuator plate 2 can include only one side plate 21, and the shoes 22, the friction plate 23, and the peg 25 are mounted on the side plate 21.

In the preferred form shown, the clutch hub 3 is mounted around the side plates 21 of the actuator plate 2. The clutch hub 3 includes a disc 31 and an annular wall with an inner peripheral friction section 32 surrounding the shoes 22. The disc 31 includes a hole 33 having spline grooves 34 formed in an inner periphery thereof. The clutch 3 further includes a linking mechanism for abutting and moving the peg 25 while the clutch hub 3 is rotating. In the preferred form shown, the linking mechanism includes a slot 35, a block 36, and two elastic elements 37. The slot 35 is formed in the disc 31 in a location in a circumferential path of the peg 25. The block 36 includes an abutting portion 361 and an engaging board 362. The abutting portion 361 is located on an inner side of the slot 35 and has a width larger than that of the slot 35. The abutting portion 361 includes a protrusion 363 received in the slot 35. The abutting portion 361 is located on an outer side of the slot 35 and has a width larger than that of the slot 35. The abutting portion 361 and the engaging board 362 are fixed together by fasteners 364. The protrusion 363 is movable in the slot 35 in a radial direction such that the block 36 is movable in the radial direction. In the preferred form shown, each elastic element 37 is in the form of a torsion spring having two tangs respectively fixed to the block 36 and the disc 31 of the clutch hub 3. In the most preferred form shown, the disc 31 includes two receptacles 311 receiving a tang of one of the elastic elements 37. A coil portion of each elastic element 37 is retained to the disc 31 by a bolt. When the clutch hub 3 does not rotate, the block 36 is in a position not in the circumferential path of the peg 25 under the action of the elastic elements 37. On the other hand, when the clutch hub 3 reaches a preset speed, the centrifugal force of the clutch hub 3 moves the block 36 radially outward to a position in the circumferential path of the peg 25. It can be appreciated that the elastic elements 37 can be in the form of a tension spring. Furthermore, the clutch according to the preferred teachings of the present invention can include only one elastic element 37.

The shaft 4 is extended through the driving wheel 1, the actuator plate 2, and the clutch hub 3. The shaft 4 includes a spline section 41 engaged with the spline grooves 34. The shaft 4 further includes a threaded end 42 extending beyond the disc 31 and engaged with a nut 43. The shaft 4 is connected to a wheel axle of the motor vehicle.

Figure 1:
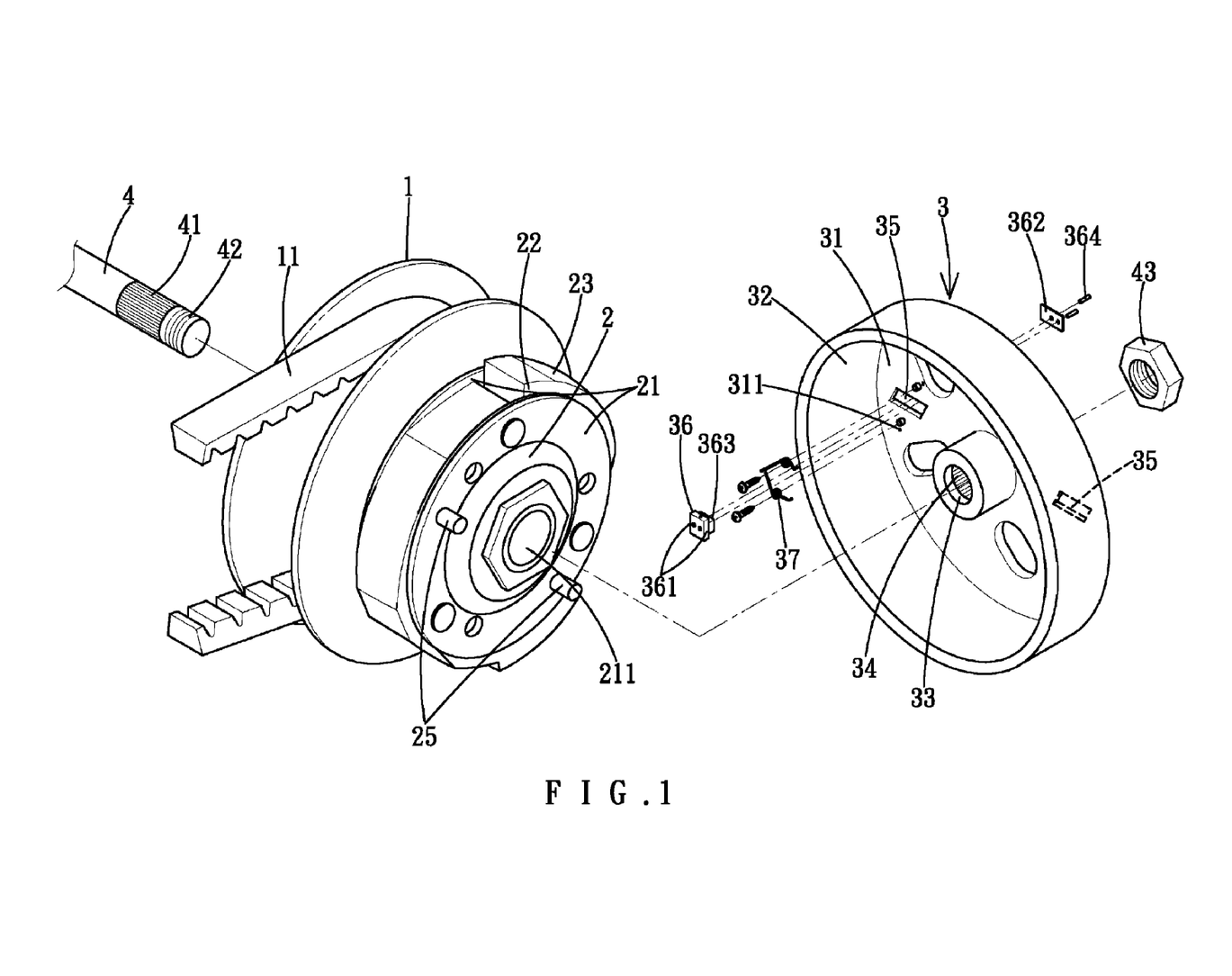
FIG. 1 shows an exploded, perspective view of a clutch according to the preferred teachings of the present invention.
Figure 2:
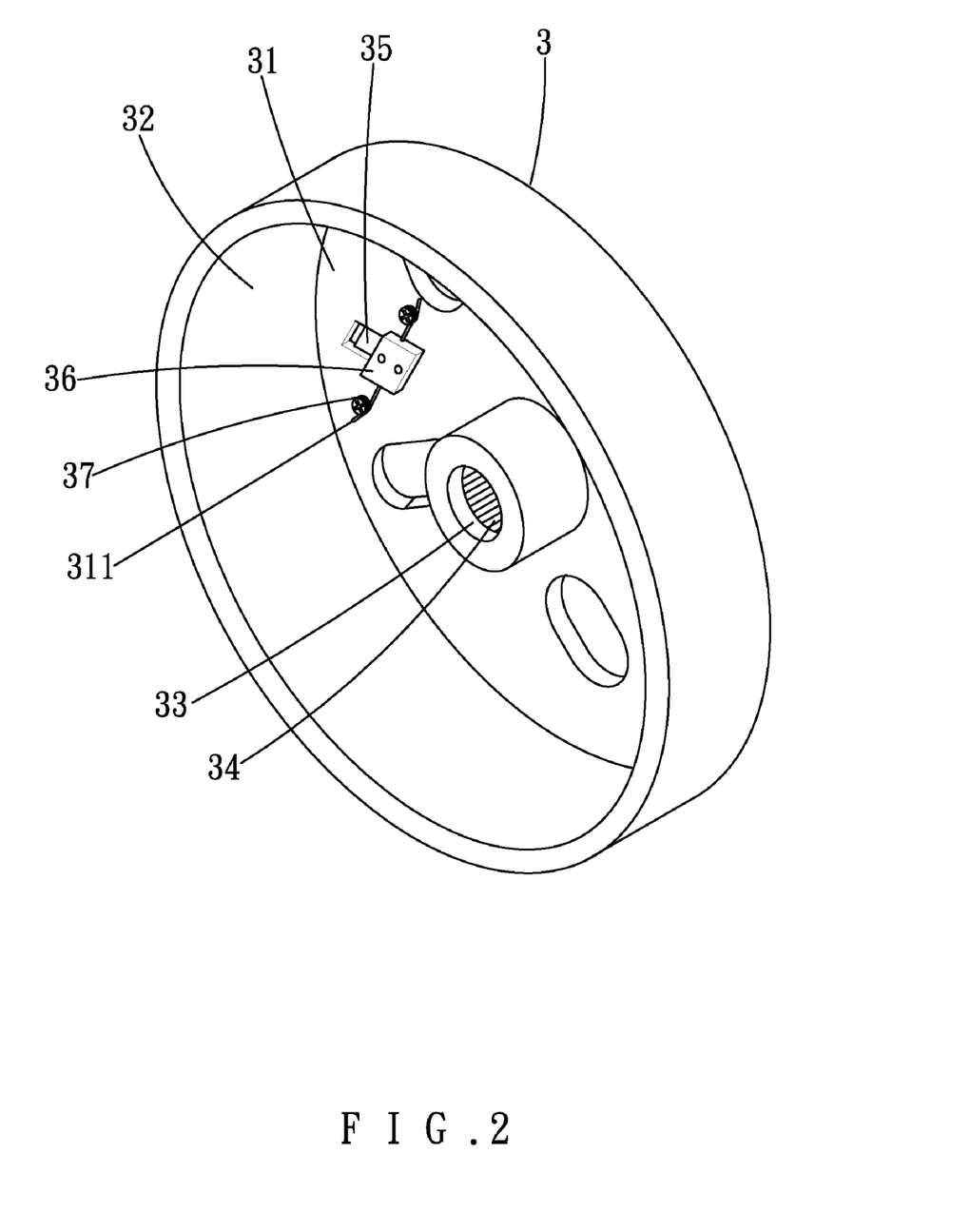
FIG. 2 shows a perspective view of a clutch hub of the clutch of FIG. 1.
Figure 3:
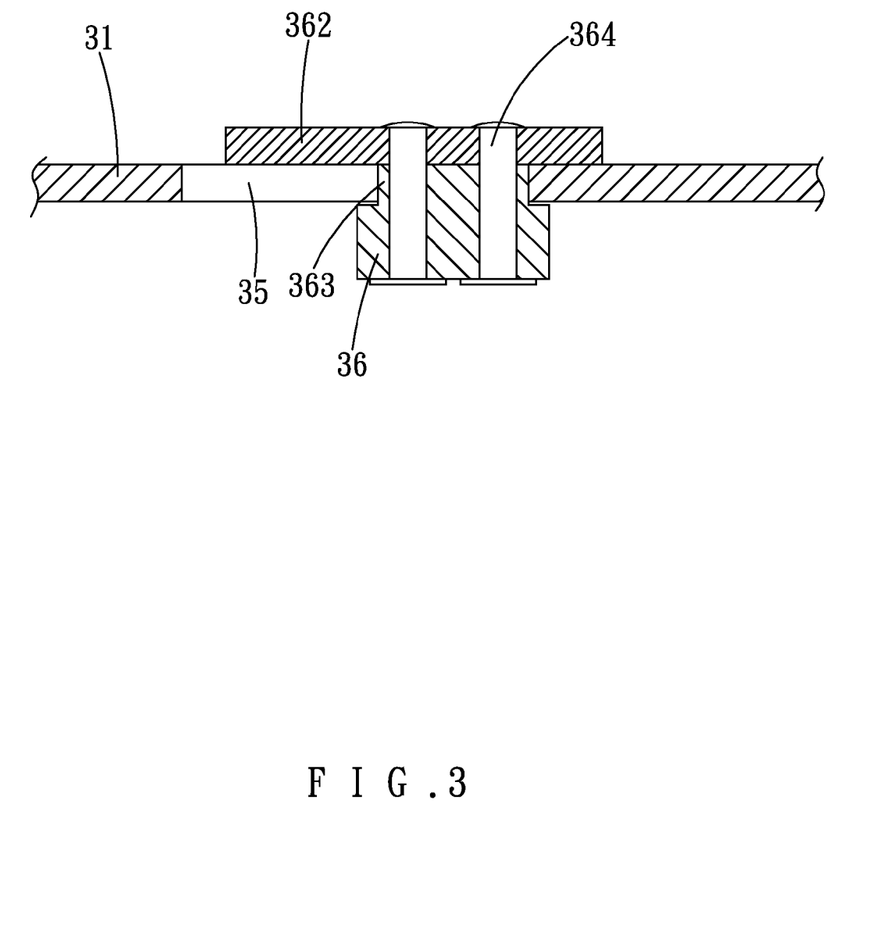
FIG. 3 shows a partial, cross sectional view of the clutch hub of FIG. 2.
Figure 4:
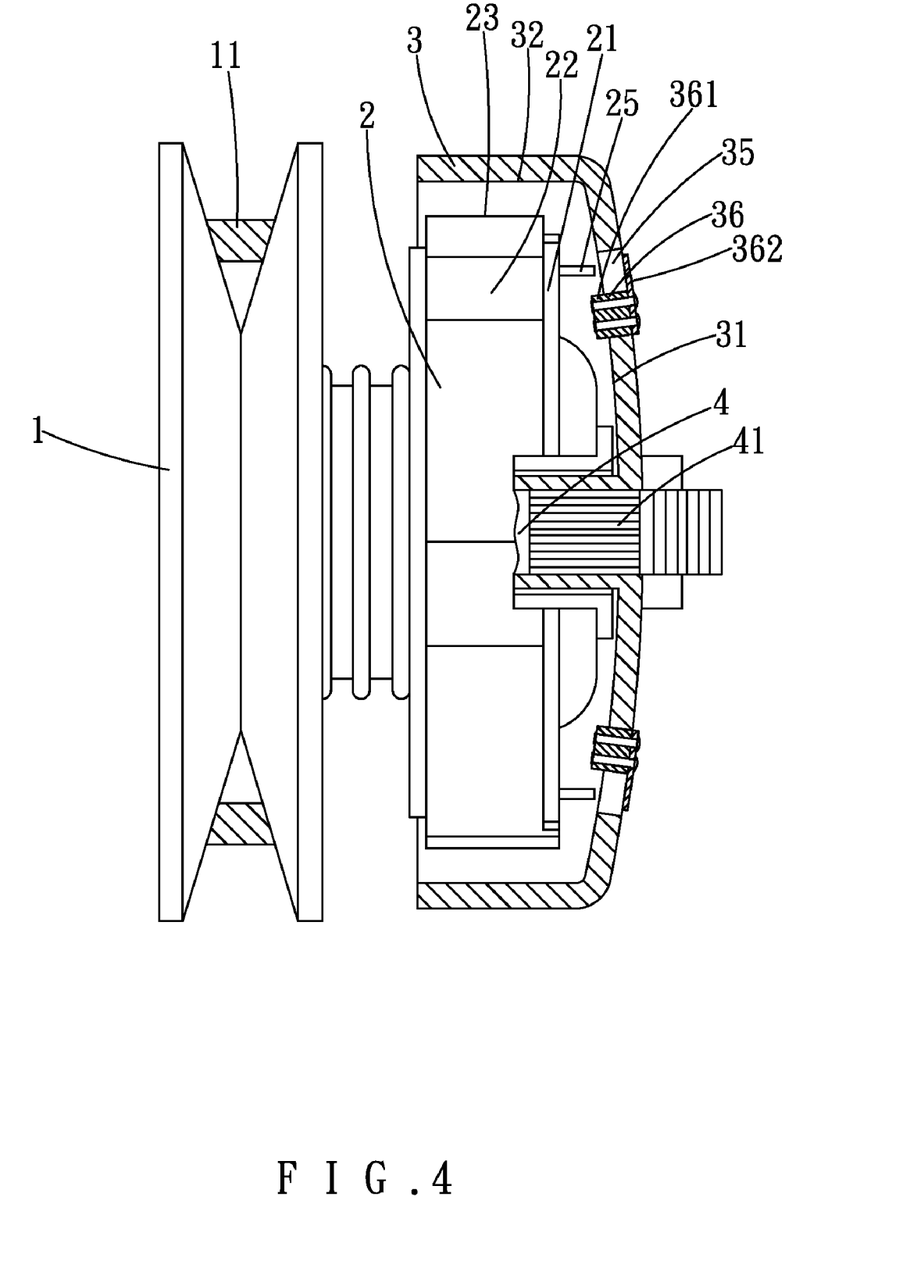
FIG. 4 shows a partial, cross sectional view of the clutch of FIG. 1.
Figure 5:
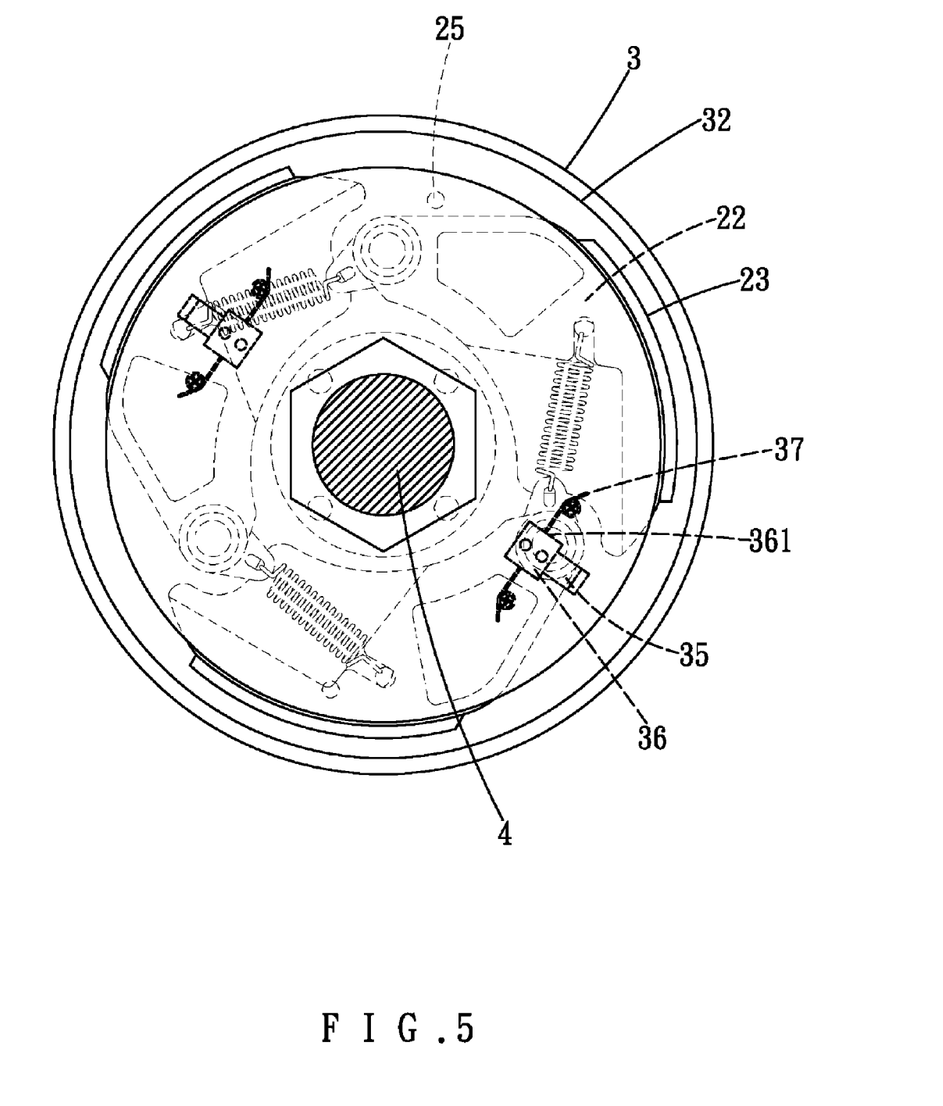
FIG. 5 shows an end elevational view of the clutch of FIG. 1.
Figure 6:
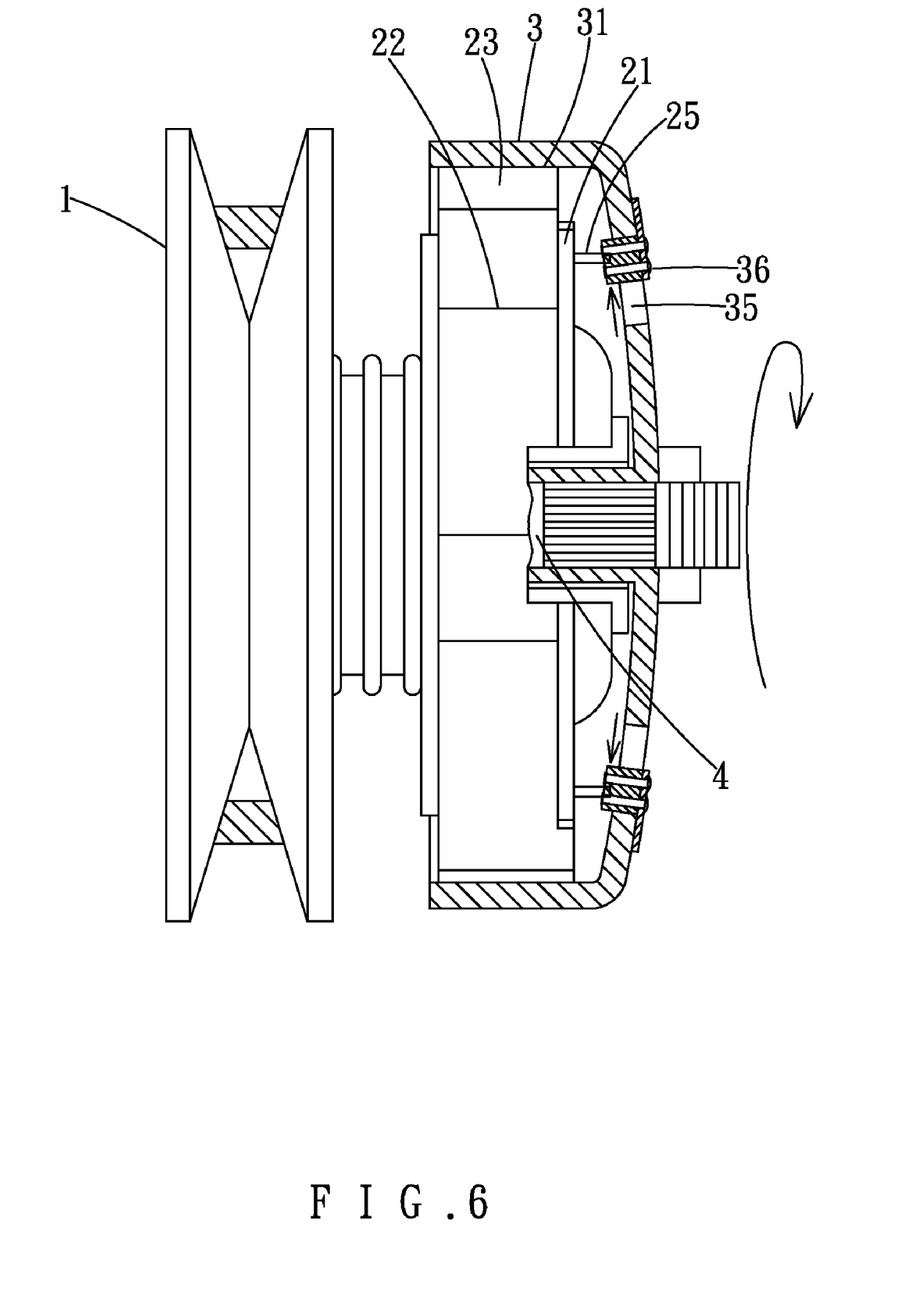
FIG. 6 is a view similar to FIG. 4, illustrating operation of the clutch during slipping of an actuator plate.
Figure 7:
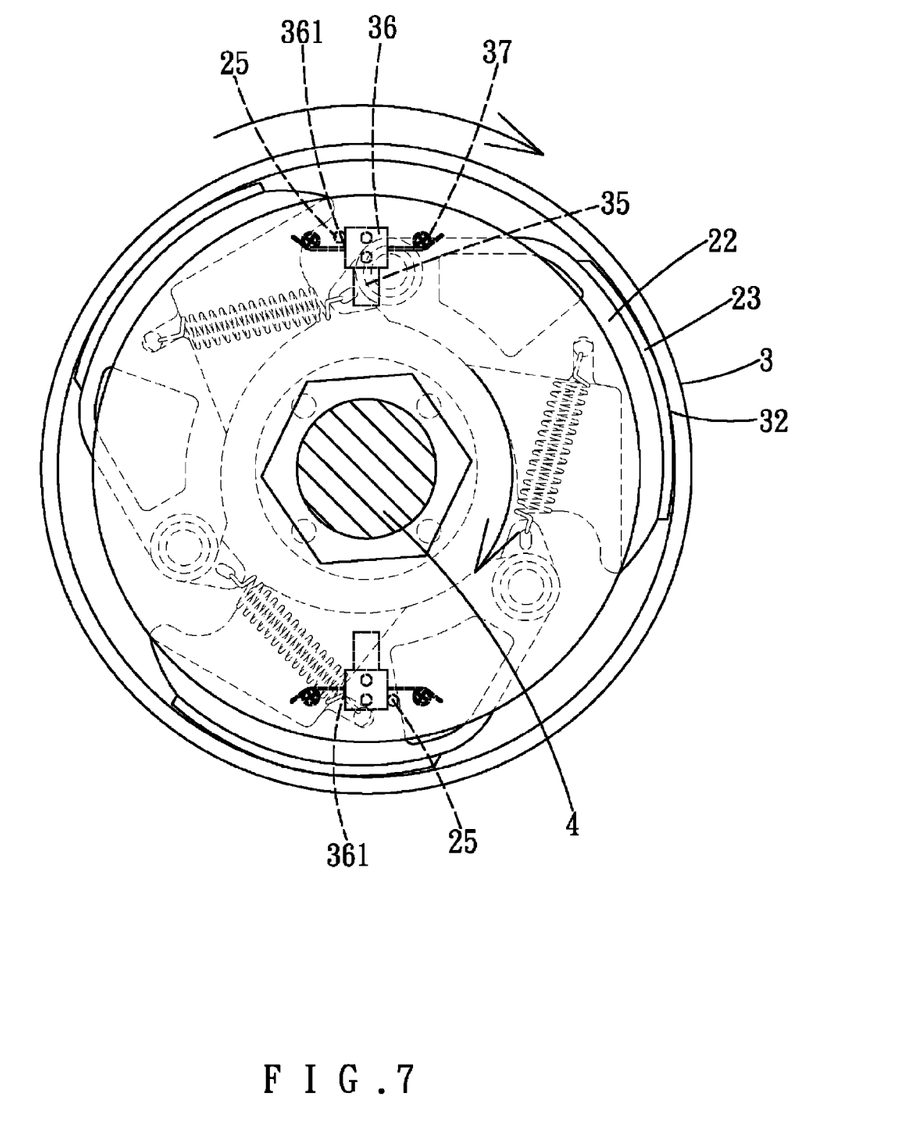
FIG. 7 is a view similar to FIG. 5, illustrating operation of the clutch during slipping of an actuator plate.

With reference to FIGS. 6 and 7, the output of the engine of the motor vehicle drives the driving wheel 1 and the actuator plate 2 to rotate. When the speed of the actuator plate 2 exceeds 1500 RPM, the centrifugal force of the rotating actuator plate 2 is larger than the returning force of the springs 24. The shoes 22 pivot outward so that the friction plates 23 are in friction engagement with the inner peripheral friction section 32 of the clutch hub 3. Thus, the actuator plate 2 can drive the clutch hub 3, the shaft 4, and the wheel axle to rotate, moving the motor vehicle forward while providing continuously variable transmission. Furthermore, the block 36 is moved radially outward by the rotating hub 3 driven by the actuator plate 2 to the position in the circumferential path of the peg 25 of the actuator plate 2. Thus, the peg 25 abuts the block 36 such that the speed of the peg 25 is the same as the block 36, assuring that the clutch hub 3 and the actuator plate 2 rotate at the same speed and avoiding transmission loss resulting from slipping of the friction plates 23.

Figure 8:
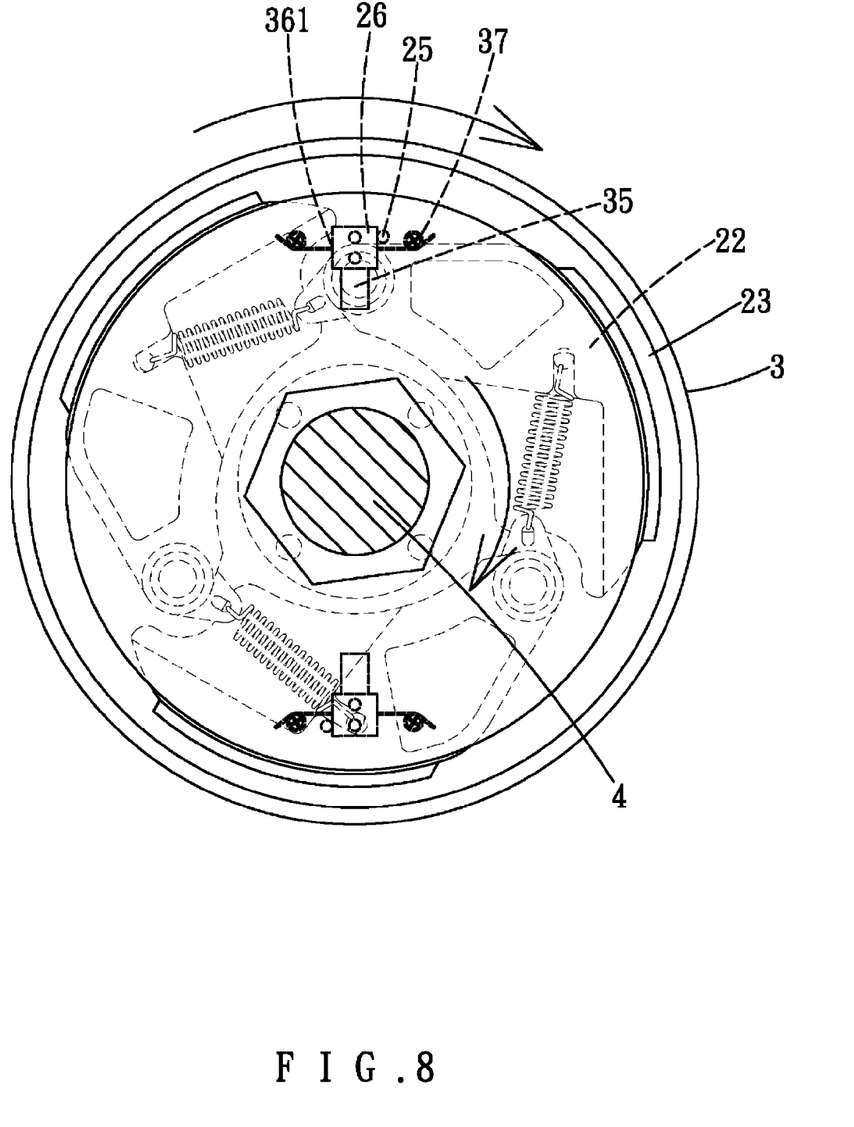
FIG. 8 is a view similar to FIG. 7, illustrating engine braking provided by the clutch.

With reference to FIG. 8, when the motor vehicle is moving downhill, the driving wheel 1 and the actuator plate 2 rotate at an idle speed below 1500 RPM. In this case, the shoes 22 can not move to a position to rotate together with the clutch hub 3. Furthermore, the wheels of the downhill motor vehicle drive the wheel axle and the shaft 4 to rotate, which, in turns, drives the clutch hub 3 to rotate freely relative to the actuator plate 2. However, the resiliency of the elastic elements 37 can be selected so that the block 36 moves radially outward to a position in the circumferential path of the peg 25 when the clutch hub 3 of the downhill motor vehicle exceeds another preset speed. As an example, in a case that a tire of a wheel of the motor vehicle has a circumference of 166.6 cm, it is set that the block 36 moves radially outward to the position in the circumferential path of the peg 25 when the speed of the clutch hub 3 of the downhill motor vehicle reaches 100 RPM. Thus, the block 36 abuts and drives the peg 25 when the downhill speed is 10 KM. Since the actuator plate 2 and the driving wheel 1 are rotated due to abutting between the block 36 and the peg 25, engine braking effect is obtained while the motor vehicle is moving downhill Driving safety is, thus, enhanced.

It can be appreciated that the number of the peg 25 and the block 36 can be more than one.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A clutch for a motor vehicle comprising:

a driving wheel adapted to be driven by output of an engine of the motor vehicle;

an actuator plate jointly rotatable with the driving wheel, with the actuator plate including a side plate, with a plurality of shoes pivotably mounted to the side plate, with a friction plate mounted on an outer face of each of the plurality of shoes, with the plurality of shoes connected to a plurality of springs, with the side plate further including a peg;

a clutch hub mounted around the side plate of the actuator plate, with the clutch hub including a disc and an annular wall with an inner peripheral friction section surrounding the plurality of shoes, with the plurality of shoes moving outward when the actuator plate rotates, engaging the friction plates with the inner peripheral friction section of the clutch hub so that the clutch hub rotates jointly with the actuator plate, with the clutch further including a linking mechanism for abutting and moving the peg while the clutch hub is rotating, with the linking mechanism including a block and an elastic element, with the block movably mounted to the disc, with the elastic element mounted between the block and the clutch hub, with the block being located in a first position not located in a circumferential path of the peg under action of the elastic element when the clutch hub does not rotate, with the block being moved to a second position in the circumferential path of the peg by centrifugal force of the clutch hub when the clutch hub exceeds a first preset speed; and a shaft extending through the driving wheel, the actuator plate, and the clutch hub, with the shaft jointly rotatable with the driving wheel, with the shaft adapted to be connected to a wheel axle of the motor vehicle.

2. The clutch as claimed in claim 1, with the linking mechanism further including a slot formed in the disc in a location in the circumferential path of the peg, with the block includes an abutting portion and an engaging board, with the abutting portion located on an inner side of the slot and having a width larger than that of the slot, with the abutting portion including a protrusion received in the slot, with the abutting portion located on an outer side of the slot and having a width larger than that of the slot, with the abutting portion and the engaging board fixed together, with the protrusion movable in the slot in a radial direction such that the block is movable in the radial direction.

3. The clutch as claimed in claim 1, with the elastic element being a torsion spring or a tension spring.

4. The clutch as claimed in claim 1, with the block being moved to the second position in the circumferential path of the peg when the clutch hub rotated by wheels of the downhill motor vehicle exceeds a second preset speed, with the block abutting the peg such that the actuator and the driving wheel are driven by the clutch hub to provide engine braking.

* * * * *